United States Patent
Nagayama et al.

(10) Patent No.: US 11,433,485 B2
(45) Date of Patent: Sep. 6, 2022

(54) CUTTING PROCESSING MACHINE AND CUTTING PROCESSING METHOD

(71) Applicant: Amada Co., Ltd., Kanagawa (JP)

(72) Inventors: Takehiro Nagayama, Kanagawa (JP); Kazuhiro Kanno, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 16/977,914

(22) PCT Filed: Mar. 5, 2019

(86) PCT No.: PCT/JP2019/008525
§ 371 (c)(1),
(2) Date: Sep. 3, 2020

(87) PCT Pub. No.: WO2019/176630
PCT Pub. Date: Sep. 19, 2019

(65) Prior Publication Data
US 2020/0398380 A1 Dec. 24, 2020

(30) Foreign Application Priority Data
Mar. 12, 2018 (JP) .............................. JP2018-044115

(51) Int. Cl.
*B23K 26/38* (2014.01)
*G05B 19/4155* (2006.01)

(52) U.S. Cl.
CPC .......... *B23K 26/38* (2013.01); *G05B 19/4155* (2013.01); *G05B 2219/36199* (2013.01)

(58) Field of Classification Search
CPC .. B23K 26/38; B23K 26/082; G05B 19/4155; G05B 2219/36199

(Continued)

(56) References Cited

U.S. PATENT DOCUMENTS

| 9,469,338 | B2 | 10/2016 | Norberg Ohlsson |
| 2011/0298156 | A1* | 12/2011 | Hooper ................... H01L 24/29 264/400 |

(Continued)

FOREIGN PATENT DOCUMENTS

| EP | 2694241 A | 2/2014 |
| JP | H04-86903 A | 3/1992 |

(Continued)

OTHER PUBLICATIONS

Extended European Search Report for corresponding EP Application No. 19766960.9 dated Dec. 6, 2021.
(Continued)

*Primary Examiner* — Thien S Tran
(74) *Attorney, Agent, or Firm* — Renner, Otto, Boisselle & Sklar, LLP

(57) ABSTRACT

A cutting processing machine (1) includes an NC device (200). The NC device (200) includes a tool radius compensation amount calculator (201), a processing trace calculator (202), and a driving controller (203). In a case where a processing condition (CP) includes cutting tool change information set with a change of a tool trace (TP) during cutting processing and set such that, in a case where the tool trace (TP) is changed, a control center point (CL) is fixed relative to a surface to be processed of a final processed product, the tool radius compensation amount calculator (201) recognizes a plurality of tool traces (TP) included in the cutting tool change information and generates tool radius compensation information (TC) that includes the plurality of tool traces (TP), positions formed with a surface to be processed (MPL), the control center point (CL), and tool radius compensation values (MVL). The processing trace calculator (202) generates a tool radius compensation control signal (TS).

5 Claims, 9 Drawing Sheets

(58) Field of Classification Search
USPC .......................... 219/121.78, 121.79, 121.82
See application file for complete search history.

(56) References Cited

U.S. PATENT DOCUMENTS

| 2014/0060271 A1 | 3/2014 | Norberg Ohlsson |
| 2017/0021450 A1 | 1/2017 | Ostholt et al. |

FOREIGN PATENT DOCUMENTS

| JP | H10328870 A | 12/1998 | |
| JP | 2010162561 A | 7/2010 | |
| JP | 5201098 B2 | 6/2013 | |
| JP | 2016-055326 A | 4/2016 | |
| JP | 6087483 B1 | 3/2017 | |
| WO | WO-2017199410 A1 * | 11/2017 | ............. B23K 26/38 |

OTHER PUBLICATIONS

International Search Report for corresponding Application No. PCT/JP2019/008525, dated May 28, 2019.
Written Opinion for corresponding Application No. PCT/JP2019/008525, dated May 28, 2019.

* cited by examiner

CUTTING PROCESSING MACHINE AND CUTTING PROCESSING METHOD

TECHNICAL FIELD

The present disclosure relates to a cutting processing machine such as a laser processing machine and a cutting processing method for irradiating a processing object with a laser beam for processing it.

BACKGROUND ART

As a cutting processing machine, a laser processing machine has been popular that irradiates a processing object with a laser beam for processing it, and thus, creates a product having a predetermined shape. The laser processing machine performs cutting processing to the processing object in accordance with a tool radius compensation assuming a cut amount by using a laser beam so that a product is created to have a predetermined shape. Patent Literature 1 discloses an example of a laser processing machine that performs cutting processing to a processing object in accordance with a tool radius compensation.

CITATION LIST

Patent Literature

[Patent Literature 1] Japanese Patent No. 6087483

SUMMARY OF THE INVENTION

In a laser processing machine, in a state where a relative position between a nozzle from which a laser beam is emitted and a processing table on which a processing object is placed is fixed, the laser beam normally has a circular shape, and thus, a cutting processing trace also has a circular shape. Even in a case of a machining center having a plurality of types of rotary tools, in a state where positional coordinates of a rotary tool are fixed, a cutting processing trace normally has a circular shape. In a case of a water jet processing device also, in a state where coordinates of a position from which high-pressure water is emitted are fixed, a cutting processing trace normally has a circular shape. Accordingly, a tool radius compensation assumes that a cutting processing trace in a state where positional coordinates of a cutting tool such as a nozzle, a rotary tool, and high-pressure water are fixed has a circular shape.

Therefore, a cutting processing machine such as a laser processing machine controls a trace in a case where cutting processing is performed to a processing object by setting an amount corresponding to a radius of a cutting processing trace by a cutting tool or an amount corresponding to a half width of the cutting processing trace to the tool radius compensation amount and shifting the cutting tool by the tool radius compensation amount. Typically, a tool radius compensation of a prior cutting processing machine does not meet a case where a cutting processing trace has a noncircular shape.

An object of an embodiment is to provide a cutting processing machine and a cutting processing method that allow correcting a tool diameter of a cutting tool with high precision even in a case where a cutting processing trace in a state where positional coordinates of a cutting tool are fixed has a noncircular shape.

A first aspect of the embodiment provides a cutting processing machine that includes: a processing machine body configured to perform cutting processing to a processing object; and an NC device configured to control the processing machine body; wherein the NC device includes: a tool radius compensation amount calculator configured to generate tool radius compensation information for correcting a tool diameter of a cutting tool used for performing the cutting processing to the processing object in accordance with a processing program and a processing condition set based on product shape information indicating a size and a shape of a final processed product obtained by performing the cutting processing to the processing object; a processing trace calculator configured to generate a tool radius compensation control signal including a cutting processing correction condition based on the processing program, the processing condition, and the tool radius compensation information; and a driving controller configured to generate a drive control signal for controlling the processing machine body based on the tool radius compensation control signal; wherein the processing machine body includes: a processing unit configured to perform the cutting processing to the processing object by changing a position relative to the processing object; and a tool trace controller configured to control a tool trace that corresponds to the cutting tool and includes a noncircular shape based on the drive control signal; wherein in a case where the processing condition includes cutting tool change information set with a change of the tool trace during the cutting processing and set such that a control center point for controlling the tool trace is fixed relative to a surface to be processed of the final processed product at a time of changing the tool trace; the tool radius compensation amount calculator recognizes a plurality of tool traces included in the cutting tool change information and generates the tool radius compensation information that includes the plurality of tool traces, positions formed with a surface to be processed that are switch reference positions of the plurality of tool traces, each control center point of the plurality of tool traces, and tool radius compensation values corresponding to a distance from the control center point to each position formed with the surface to be processed; the processing trace calculator generates the tool radius compensation control signal for switching the plurality of tool traces; and the processing machine body, based on the tool radius compensation control signal, fixes the control center point, causes the positions formed with the surface to be processed to be matched, and switches the tool trace such that the tool radius compensation values have the same value.

A second aspect of the embodiment provides a cutting processing method including: generating tool radius compensation information for correcting a tool diameter of a cutting tool used for performing cutting processing to a processing object in accordance with a processing program and a processing condition set based on product shape information indicating a size and a shape of a final processed product obtained by performing the cutting processing to the processing object; generating a tool radius compensation control signal based on the processing program, the processing condition, and the tool radius compensation information; generating a drive control signal based on the tool radius compensation control signal; in a case where the processing condition includes cutting tool change information set with a change of a tool trace that corresponds to the cutting tool and includes a noncircular shape during the cutting processing and set such that a control center point for controlling the tool trace is fixed relative to a surface to be processed of the final processed product at a time of changing the tool trace; recognizing a plurality of tool traces included in the cutting tool change information; generating the tool radius compensation information that includes the plurality of tool traces, positions formed with a surface to be processed that are switch reference positions of the plurality of tool traces, each control center point of the plurality of tool traces, and tool radius compensation values corresponding to a distance from the control center point to each position formed with the surface to be processed; generating the tool radius compensation control signal for switching the plurality of tool traces; and, based on the tool radius compensation control signal, fixing the control center point, causing the positions formed with the surface to be processed to be matched, and switching the tool trace such that the tool radius compensation values have the same value.

In accordance with a cutting processing machine and a cutting processing method according to the embodiment, even in a case where a cutting processing trace in a state where positional coordinates of a cutting tool are fixed has a noncircular shape, a tool diameter of the cutting tool can be corrected with high precision.

MODES FOR CARRYING OUT THE INVENTION

A cutting processing machine and a cutting processing method according to an embodiment are described below with reference to the accompanying drawings. As an example of the cutting processing machine and the cutting processing method, a laser processing machine and a laser processing method are described.

Figure 1:
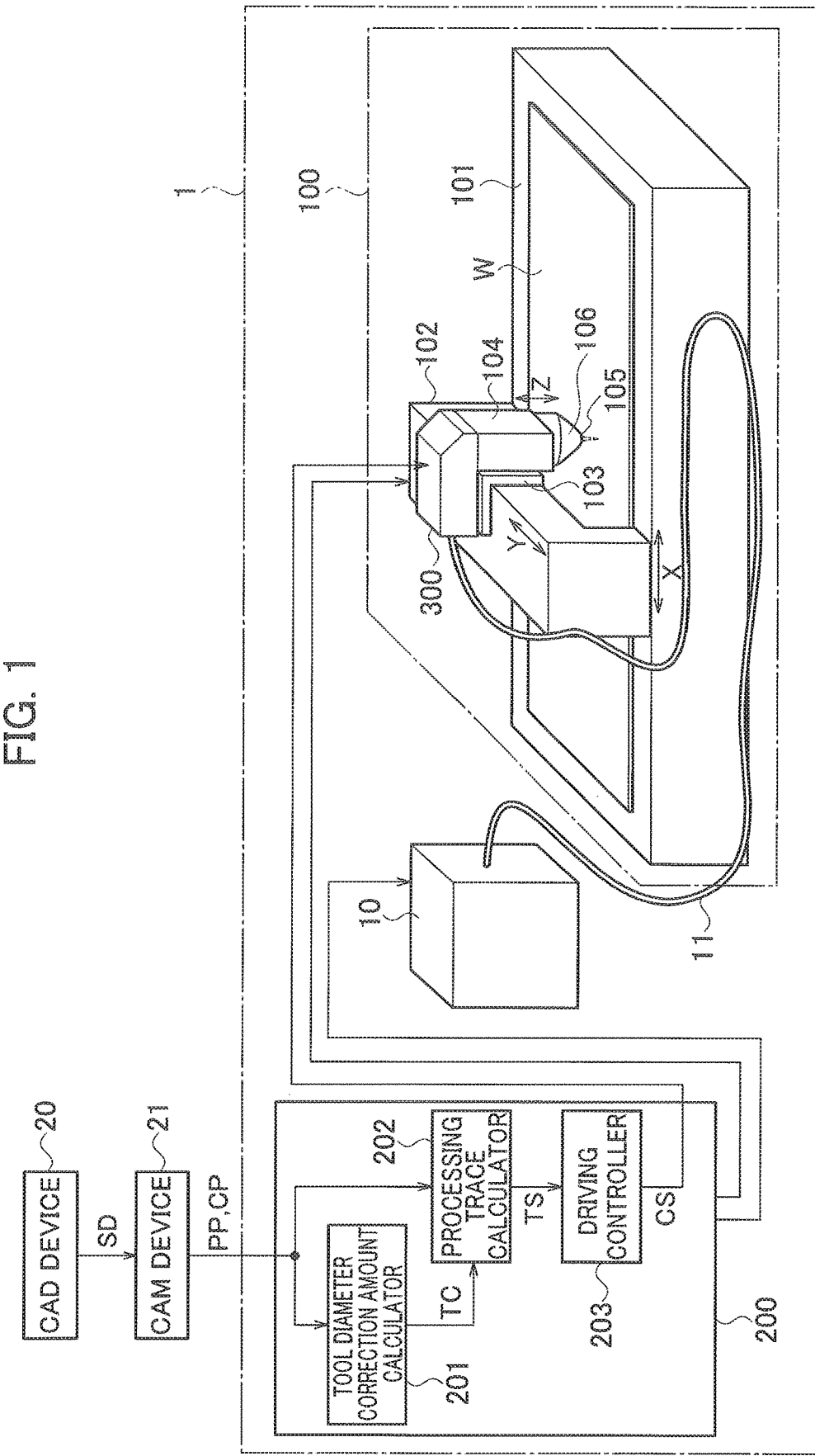
FIG. 1 is a diagram illustrating an example of an entire configuration of a cutting processing machine according to an embodiment.

As illustrated in FIG. 1, a cutting processing machine 1 includes a laser oscillator 10, a processing machine body 100, and an NC device (numerical control device) 200. The NC device 200 controls the laser oscillator 10 and the processing machine body 100. The laser oscillator 10 generates a laser beam to emit the laser beam. The laser beam emitted from the laser oscillator 10 is transmitted to the processing machine body 100 via a process fiber 11. The processing machine body 100 performs cutting processing to a processing object W by irradiating the processing object W with a laser beam and changing a relative position between the processing object W and a beam spot of a laser beam.

As the laser oscillator 10, a laser oscillator that amplifies an excitation beam emitted from a laser diode to emit a laser beam having a predetermined wavelength or a laser oscillator that directly uses a laser beam emitted from a laser diode is preferable. Examples of the laser oscillator 10 include a solid laser oscillator, a fiber laser oscillator, a disk laser oscillator, or a direct diode laser oscillator (DDL oscillator).

The laser oscillator 10 emits a 1 μm band laser beam having a wavelength of 900 nm to 1100 nm. The fiber laser oscillator and the DDL oscillator will be described as examples. The fiber laser oscillator emits a laser beam having a wavelength of 1060 nm to 1080 nm. The DDL oscillator emits a laser beam having a wavelength of 910 nm to 950 nm.

The processing machine body 100 includes a processing table 101 on which the processing object W is placed, a gate type X-axis carriage 102, a Y-axis carriage 103, a processing unit 104, and a tool trace controller 300. The processing object W is steel metal made of, for example, stainless steel. A processing object may be an iron-based sheet metal other than stainless steel or may by a sheet metal such as aluminum, aluminum alloys, copper steel and the like. A laser beam emitted from the laser oscillator 10 is transmitted to the processing unit 104 in the processing machine body 100 via the process fiber 11. A tool trace controller 300 is housed in the processing unit 104.

The X-axis carriage 102 is configured to be movable on the processing table 101 in an X-axis direction. The Y-axis carriage 103 is configured to be movable on the X-axis carriage 102 in a direction of a Y-axis orthogonal to an X-axis. The X-axis carriage 102 and the Y-axis carriage 103 function as a moving mechanism for moving the processing unit 104 along the surface of the processing object W in an X-axis direction, a Y-axis direction, or an arbitrary combination direction of the X-axis and the Y-axis.

Instead of moving, by the processing machine body 100, the processing unit 104 along the surface of the processing object W, it may be configured such that a position of the processing unit 104 is fixed and the processing object W moves. The processing machine body 100 may include a moving mechanism that moves a relative position of the processing unit 104 to the surface of the processing object W.

A nozzle 106 is attached to the processing unit 104. To a tip portion of the nozzle 106, a circular opening 105 is formed. The processing object W is irradiated with a laser beam that is transmitted to the processing unit 104 and then emitted through the opening 105 of the nozzle 106.

Assist gas of nitrogen, air or the like is supplied to the processing unit 104. The assist gas may be oxygen and a mix ratio thereof can be set in any manner depending on whether an object of the assist gas is the inhibition of oxidation or use of an oxidation reaction heat. The processing object W is irradiated with a laser beam through the opening 105 and the assist gas is jetted onto the processing object W through the opening 105. The assist gas discharges molten metal melted by the processing object W in a kerf width.

The tool trace controller 300 functions as a beam oscillation mechanism that causes a laser beam propagated in the that processing unit 104 and is emitted through the opening 105 to be oscillated in a noncircular oscillation pattern. By the tool trace controller 300 causing the laser beam to be oscillated in a noncircular oscillation pattern, the processing unit 104 performs cutting processing to the processing object W in accordance with a noncircular tool trace. An example of a specific configuration of the tool trace controller 300 and how the tool trace controller 300 causes a beam spot of a laser beam to be oscillated in a noncircular oscillation pattern are described later. The tool trace indicates a graphic drawing based on a beam trace made by the oscillation of the beam oscillated in a noncircular oscillation pattern during a defined period of time and indicates an oscillating tool shape. That is, normally, a circular laser beam itself emitted from the nozzle 106 is a cutting tool and a tool diameter is corrected by a beam radius, but here, a tool trace of a graphic drawn in an oscillation pattern is assumed to be a cutting tool. A cutting processing trace in a state where a relative position between the nozzle 106 and the processing table 101 is fixed corresponds to a tool trace.

A CAD (Computer Aided Design) device 20 generates product shape data (CAD data) SD based on product shape information indicating a size and a shape of a final processed product obtained by performing cutting processing to the processing object W and outputs the generated data to a CAM (computer aided manufacturing) device 21. The CAM device 21, based on the product shape data SD, generates a processing program (NC data) PP used by the cutting processing machine 1 to perform the cutting processing to the processing object W and specifies a processing condition CP. That is, the processing program PP and the processing condition CP are set based on product shape information indicating a size and a shape of a final processed product.

The processing program PP includes a G code indicated by G41 (a left-side tool radius compensation) for controlling the trace of the cutting tool by shifting the trace on the left side of a propagation direction of cutting processing by the tool radius compensation amount or G42 (a right-side tool radius compensation) for controlling the trace of the cutting tool by shifting the trace on the right side of the propagation direction of cutting processing by the tool radius compensation amount.

The CAM device 21, as the processing condition CP, specifies the tool trace corresponding to the cutting tool. The tool trace has, for example, a noncircular shape. The CAM device 21 can specify a plurality of tool traces that varies in shapes or tool diameters. The processing condition CP includes cutting tool change information for changing the tool trace during the cutting processing.

In a case where the tool trace is changed during the cutting processing, the CAM device 21 can set whether the control center point for controlling the tool trace is fixed to the surface to be processed of the final processed product. Fixing the control center point allows fixing of a tool radius compensation value. In a case where the control center point is not fixed, the tool radius compensation value changes depending on the tool trace to be changed. The processing condition CP includes cutting tool change information set with whether to fix the control center point. The control center point is the center of a laser beam in a case of a tool radius compensation in a prior laser processing, and in the present embodiment, is the center position for controlling the cutting tool for a cutting line (a cutting position) that is a boundary between a cutting tool and a product in a case where a tool trace is a cutting tool having a noncircular shape.

The processing condition CP includes processing target information specified with material parameters of materials, thicknesses and the like of the processing object W. Further, the processing condition CP includes cutting processing information indicating processing parameters of outputs of a laser beam, a processing speed, diameters (nozzle diameters) of the opening 105 of the nozzle 106 and the like, assist gas conditions and the like. That is, the processing condition CP includes the cutting tool change information, the processing target information, and the cutting processing information.

The CAM device 21 outputs the processing program PP and the processing condition CP to the NC device 200 in the cutting processing machine 1. The NC device 200, based on the processing program PP and the processing condition CP, controls the laser oscillator 10. The NC device 200 moves the nozzle 106 to an objective position by, based on the processing program PP and the processing condition CP, controlling the processing machine body 100 and driving the X-axis carriage 102 and the Y-axis carriage 103.

The NC device 200 controls a trace of the beam spot of the laser beam emitted through the opening 105 of the nozzle 106 by, based on the processing program PP and the processing condition CP, controlling the tool trace controller 300. The trace of the beam spot corresponds to the tool trace.

The NC device 200 includes a tool radius compensation amount calculator 201, a processing trace calculator 202, and a driving controller 203. The tool radius compensation amount calculator 201 and the processing trace calculator 202 receive, from the CAM device 21, the processing program PP and the processing condition CP. The tool radius compensation amount calculator 201, based on the processing program PP and the processing condition CP, generates tool radius compensation information TC for correcting the tool diameter of the cutting tool used for performing the cutting processing to the processing object W.

Figure 2:
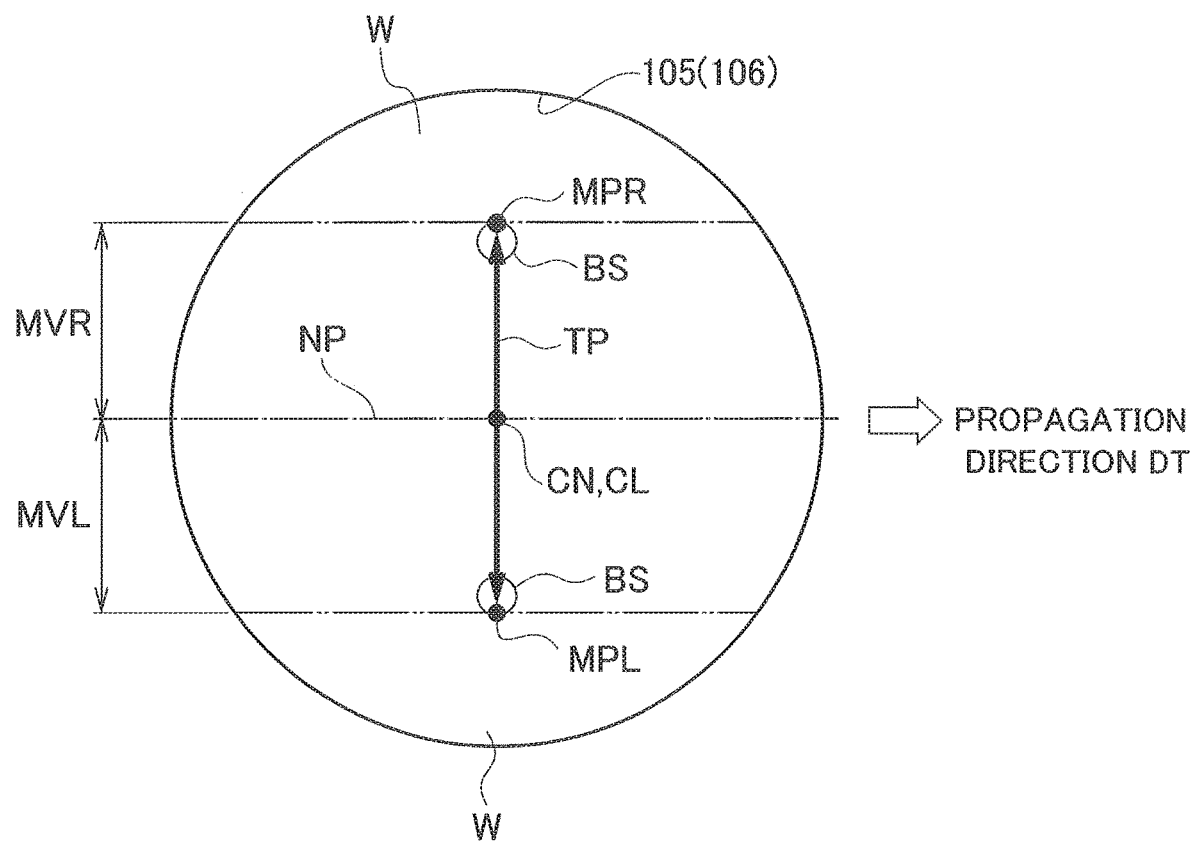
FIG. 2 is a diagram illustrating an example of a tool trace.

With reference to FIG. 2, the tool radius compensation information TC will be described. FIG. 2 illustrates a trace (tool trace) of a beam spot of a laser beam which is emitted from inside the nozzle 106 through the opening 105 to irradiate the processing object W therewith.

The tool radius compensation amount calculator 201 recognizes a tool trace TP included in the processing condition CP. The tool radius compensation amount calculator 201 generates the tool radius compensation information TC based on the recognized tool trace TP, a trace NP of the nozzle 106 (hereinafter referred to as a nozzle trace NP), and a propagation direction of cutting processing DT. The tool trace TP corresponds to the cutting tool used for performing the cutting processing to the processing object W. A shape of the tool trace TP corresponds to a shape of a cutting tool. The tool trace TP has, for example, a noncircular shape.

A sign "BS" in FIG. 2 illustrates a beam spot of a laser beam moving on the tool trace TP. In a case of the laser processing machine, the tool trace TP corresponds to a trace of the beam spot BS of the laser beam. The beam spot BS is reciprocated on the tool trace TP. Alternatively, the beam spot BS may have a noncircular shape and a cycle may vary.

As an example of a noncircular shape, FIG. 2 illustrates the tool trace TP of an oscillation pattern in which the beam spot BS is cause to be oscillated in a direction orthogonal to a propagation direction DT. The oscillation pattern of the tool trace TP may have any shape including the noncircular shape.

The tool radius compensation information TC includes the control center point CL for controlling the tool trace TP and a center point CN of the nozzle 106 for controlling the nozzle trace NP (hereinafter referred to as a nozzle center point CN). The nozzle trace NP is specifically a trace of the nozzle center point CN. The center point CN of the nozzle 106 matches a center point of the opening 105. FIG. 2 illustrates a case where the control center point CL matches the nozzle center point CN.

The tool radius compensation information TC includes tool radius compensation values MVL and MVR. The tool radius compensation values MVL and MVR correspond to a distance from the control center point CL (the nozzle center point CN) to positions formed with surfaces to be processed MPL and MPR. In a case where the tool trace TP moves in the propagation direction DT of cutting processing, the positions formed with surfaces to be processed MPL and MPR are positions in which a surface to be processed is formed on the processing object W. That is, the positions formed with surfaces to be processed MPL and MPR are positions in the tool trace TP in which a tool diameter becomes maximum. The tool radius compensation value MVL is a parameter in the left-side tool radius compensation and the tool radius compensation value MVR is a parameter in the right-side tool radius compensation.

The tool radius compensation amount calculator 201 outputs, to the processing trace calculator 202, the tool radius compensation information TC including pieces of correction information of both the left-side tool radius compensation and the right-side tool radius compensation. The processing trace calculator 202 receives, from the CAM device 21, the processing program PP and the processing condition CP, and receives, from the tool radius compensation amount calculator 201, the tool radius compensation information TC. The processing trace calculator 202 translates a G code included in the processing program PP. The processing program PP may include a robot language or the like instead of the G code.

The processing trace calculator 202, based on a translation result, determines a cutting processing correction condition of either one of a case where the cutting processing is performed in the left-side tool radius compensation and a case where the cutting processing is performed in the right-side tool radius compensation.

The processing trace calculator 202 generates a tool radius compensation control signal TS based on the translation result, the processing program PP, the processing condition CP, the tool radius compensation information TC, and the determined cutting processing correction condition. The processing trace calculator 202 outputs the tool radius compensation control signal TS to the driving controller 203. The driving controller 203, based on the tool radius compensation control signal TS, generates a drive control signal CS for controlling the processing machine body 100. The driving controller 203 outputs the drive control signal CS to the processing machine body 100.

In a case where the cutting processing is performed in the left-side tool radius compensation, the driving controller 203 generates the drive control signal CS based on the nozzle trace NP, the tool trace TP, the control center point CL of the tool trace TP, and the tool radius compensation value MVL. Alternatively, in a case where the cutting processing is performed in the right-side tool radius compensation, the driving controller 203 generates the drive control signal CS based on the nozzle trace NP, the tool trace TP, the control center point CL of the tool trace TP, and the tool radius compensation value MVR.

The driving controller 203 controls the tool trace controller 300 of the processing machine body 100 in accordance with the drive control signal CS. The tool trace controller 300 controls the trace of the beam spot BS of the laser beam emitted through the opening 105 of the nozzle 106 based on the drive control signal CS.

Figure 3:
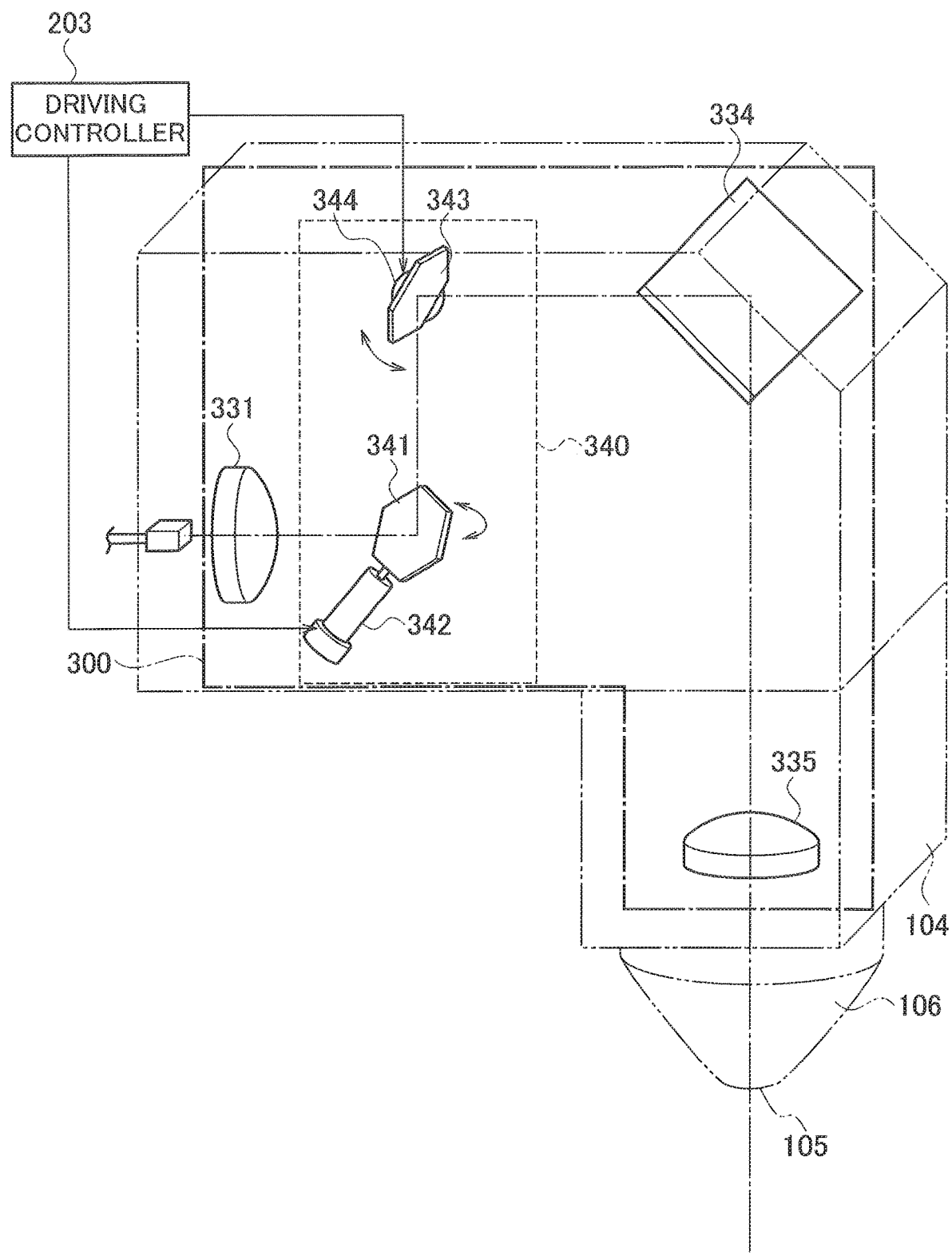
FIG. 3 is a diagram illustrating an example of a configuration of a tool trace controller.

With reference to FIG. 3, an example of a specific configuration of the tool trace controller 300 and an example of how the tool trace controller 300 causes the beam spot BS of the laser beam to be to be oscillated in the noncircular oscillation pattern are described.

As illustrated in FIG. 3, the tool trace controller 300 is housed in the processing unit 104. The tool trace controller 300 includes a collimator lens 331, a galvano scanner unit 340, a bend mirror 334, and a focusing lens 335. The collimator lens 331 converts the laser beam emitted from the process fiber 11 into parallel light (collimated light).

The galvano scanner unit 340 includes a scanning mirror 341 (a first scanning mirror), a driver 342 (a first driver) that rotates and drives the scanning mirror 341, a scanning mirror 343 (a second scanning mirror), and a driver 344 (a second driver) that rotates and drives the scanning mirror 343.

The driver 342, under control of the driving controller 203, can cause the scanning mirror 341 to be driven and reciprocated in a predetermined direction (X-direction, for example) in a predetermined angle range. The scanning mirror 341 reflects the laser beam that is converted into the parallel light by a collimator lens 321 to the scanning mirror 343.

The driver 344, under the control of the driving controller 203, can cause the scanning mirror 343 to be driven and reciprocated in a direction different from a direction in which the scanning mirror 341 is driven (Y-direction, for example) in a predetermined angle range. The scanning mirror 343 reflects the laser beam reflected from the scanning mirror 341 to the bend mirror 334.

The bend mirror 334 reflects the laser beam reflected from the scanning mirror 343 downward in a direction of a Z-axis perpendicular to the X-axis and the Y-axis. The focusing lens 335 focuses the laser beam reflected from the bend mirror 334 and irradiates the processing object W with the laser beam.

By causing either one or both of the scanning mirror 341 and the scanning mirror 343 to be oscillated and reciprocated at high speed, for example, at 1000 Hz or more, the galvano scanner unit 340 can cause the tool trace TP to have various types of noncircular shapes. That is, by focusing (condensing) laser beams having a constant light intensity or more to a plurality of points per unit time, a shape of a tool that substantially contributes to processing of the processing object W by being in contact therewith may be set in any manner such as various types of noncircular shapes.

With reference to FIG. 4, FIG. 5, FIG. 6, and FIG. 7, a case where the processing condition CP includes the cutting tool change information set with the change of the tool trace TP during the cutting processing and set with whether to fix the control center point CL for controlling the tool trace TP to the surface to be processed of the final processed product in a case where the tool trace TP is changed is described. FIG. 4 to FIG. 7 illustrate a case where the cutting processing is performed in the left-side tool radius compensation by using the tool trace TP. FIG. 4 to FIG. 7 illustrate a case where the control center point CL matches the nozzle center point CN.

The processing condition CP includes the cutting tool change information that include a plurality of tool traces TP corresponding to a plurality of cutting tools, a timing to switch the tool trace TP (a switching time or a switching position), and a switching method and is set with whether to fix the control center point CL for controlling the tool trace TP in a case where the tool trace TP is switched. The plurality of tool traces TP varies in shapes or tool diameters. The cutting tool change information includes parameters of, for example, an absence of the switch interpolation or a presence of the switch interpolation as the switching method.

The tool radius compensation amount calculator 201 recognizes whether the cutting tool change information is included in the processing condition CP. In a case where it is recognized that the processing condition CP does not include the cutting tool change information, the tool radius compensation amount calculator 201 recognizes the tool trace TP included in the processing condition CP. Alternatively, in a case where it is recognized that the processing condition CP includes the cutting tool change information, the tool radius compensation amount calculator 201 recognizes the plurality of tool traces TP included in the cutting tool change information.

The tool radius compensation amount calculator 201, based on the processing program PP and the processing condition CP, generates the tool radius compensation information TC that includes the plurality of tool traces TP, each of the positions formed with surfaces to be processed MPL and MPR that becomes a switch reference position of the plurality of tool traces TP, each control center point CL in the plurality of tool traces TP, and each of the tool radius compensation values MVL and MVR.

Figure 4:
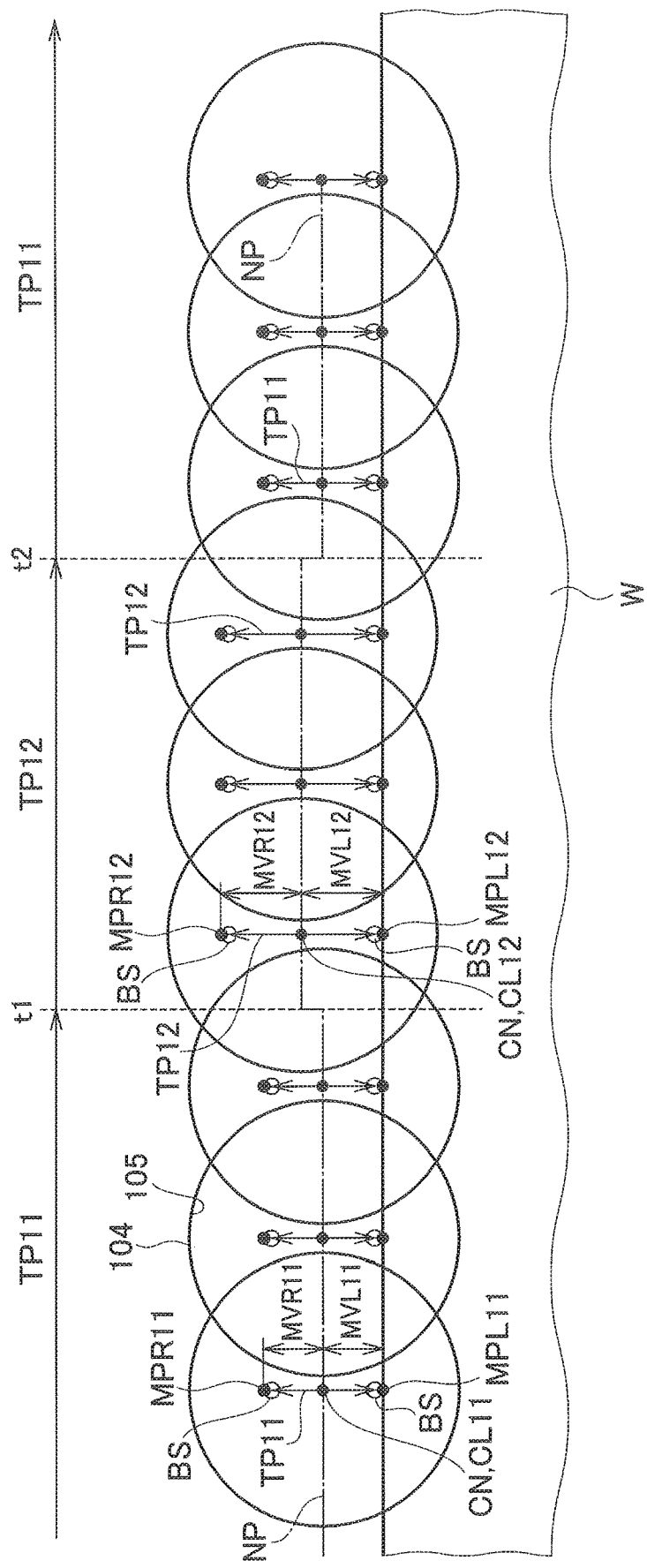
FIG. 4 is a diagram illustrating a state in which a tool trace is changed during cutting processing in a case where cutting tool change information is set with an absence of switch interpolation and set such that, in a case where a tool trace is switched, a control center point of the tool trace is not fixed.

FIG. 4 illustrates a case where the processing condition CP includes the cutting tool change information in which, at a switching time t1, a tool trace TP11 is switched to a tool trace TP12 and at a switching time t2, the tool trace TP12 is switched to the tool trace TP11. FIG. 4 illustrates a case where the cutting tool change information is set with the absence of the switch interpolation and set such that the control center point CL is not fixed in a case where the tool trace TP is switched.

In a case where the cutting tool change information is included in the processing condition CP, the tool radius compensation amount calculator 201 recognizes the tool traces TP11 and TP12 included in the cutting tool change information. The tool radius compensation amount calculator 201 generates the tool radius compensation information TC that includes the tool trace TP11 selected during a time period until the switching time t1, the control center point CL11 in the tool trace TP11, the tool radius compensation values MVL11 and MVR11, and the position formed with surfaces to be processed MPL11 and MPR11. The positions formed with surfaces to be processed MPL11 and MPR11 become the switch reference position of the tool trace TP11.

The tool radius compensation amount calculator 201 includes the tool radius compensation information TC that includes the tool trace TP12 selected during a time period from the switching time t1 to the switching time t2, the control center point CL12 in the tool trace TP12, the tool radius compensation values MVL12 and MVR12, and positions formed with surfaces to be processed MPL12 and MPR12. Positions formed with surfaces to be processed MPL12 and MPR12 become the switch reference position of the cutting tool CT2.

The tool radius compensation amount calculator 201 generates the tool radius compensation information TC that includes the tool trace TP11 selected during a time period at or after the switching time t2, the control center point CL11 in the tool trace TP11, the tool radius compensation values MVL11 and MVR11, and the position formed with surfaces to be processed MPL11 and MPR11. The tool radius compensation amount calculator 201 outputs the tool radius compensation information TC to the processing trace calculator 202.

The processing trace calculator 202 translates the G code included in the processing program PP. The processing trace calculator 202, based on the translation result, determines the cutting processing correction condition of either one of a case where the cutting processing is performed in the left-side tool radius compensation and a case where the cutting processing is performed in the right-side tool radius compensation.

In a case where it is determined that the cutting processing is performed in the left-side tool radius compensation, the processing trace calculator 202, based on the tool radius compensation information TC, at the switching time t1, causes the position formed with the surface to be processed MPL11 to be matched the position formed with the surface to be processed MPL12 and generates the tool radius compensation control signal TS that includes first switching information for switching the tool trace TP11 to the tool trace TP12.

The processing trace calculator 202 generates, at the switching time t1, the tool radius compensation control signal TS that includes second switching information for switching the control center point CL11 and the tool radius compensation value MVL11 to the control center point CL12 and the tool radius compensation value MVL12 respectively.

The processing trace calculator 202, based on the tool radius compensation information TC, at the switching time t2, causes the position formed with the surface to be processed MPL12 to be matched the position formed with the surface to be processed MPL11 and generates the tool radius compensation control signal TS that includes third switching information for switching the tool trace TP12 to the tool trace TP11.

The processing trace calculator 202, at the switching time t2, generates the tool radius compensation control signal TS that includes fourth switching information for switching the control center point CL12 and the tool radius compensation value MVL12 to the control center point CL11 and the tool radius compensation value MVL11 respectively. That is, in a case where it is determined that the cutting processing is performed in the left-side tool radius compensation, the tool radius compensation amount calculator 201 generates the tool radius compensation control signal TS that includes pieces of first to fourth switching information.

The processing trace calculator 202 outputs the tool radius compensation control signal TS to the driving controller 203. The driving controller 203, based on the tool radius compensation control signal TS, generates the drive control signal CS. The driving controller 203 controls the processing machine body 100 in accordance with the drive control signal CS. The processing machine body 100, based on the drive control signal CS, drives the X-axis carriage 102 and the Y-axis carriage 103 and controls the nozzle trace NP. Further, the processing machine body 100, based on the drive control signal CS, drives the tool trace controller 300 and controls the tool trace TP.

In a case where the cutting tool change information is set with the absence of the switch interpolation and set such that in a case where the tool trace TP is switched, the control center point CL of the tool trace TP is not fixed, the processing machine body 100, at the switching time t1, causes the position formed with a surface to be processed MPL11 to be matched the position formed with the surface to be processed MPL12 and instantaneously switches the tool trace TP11 to the tool trace TP12. The processing machine body 100, at a switching timing, performs a tool radius compensation in which the control center point CL11 and the tool radius compensation value MVL11 are changed to the control center point CL12 and the tool radius compensation value MVL12 respectively.

The processing machine body 100, at the switching time t2, causes the position formed with the surface to be processed MPL12 to be matched the position formed with the surface to be processed MPL11 and instantaneously switches the tool trace TP12 to the tool trace TP11. The processing machine body 100, at a switching timing, performs a tool radius compensation in which the control center point CL12 and the tool radius compensation value MVL12 are changed to the control center point CL11 and the tool radius compensation value MVL11 respectively.

As illustrated in FIG. 4, in a case where the control center point CL of the tool trace TP is not fixed to the positions formed with surfaces to be processed MPL and MPR corresponding to the surface to be processed of the final processed product when changing the tool trace TP, the nozzle trace NP is controlled in accordance with the changed tool trace TP. The tool traces TP11 and TP12 illustrated in FIG. 4 vary in amplitudes in a direction orthogonal to the propagation direction DT of cutting processing. Therefore, the nozzle trace NP is controlled to instantaneously move in the direction orthogonal to the propagation direction DT of cutting processing in accordance with the changed tool trace TP.

Figure 5:
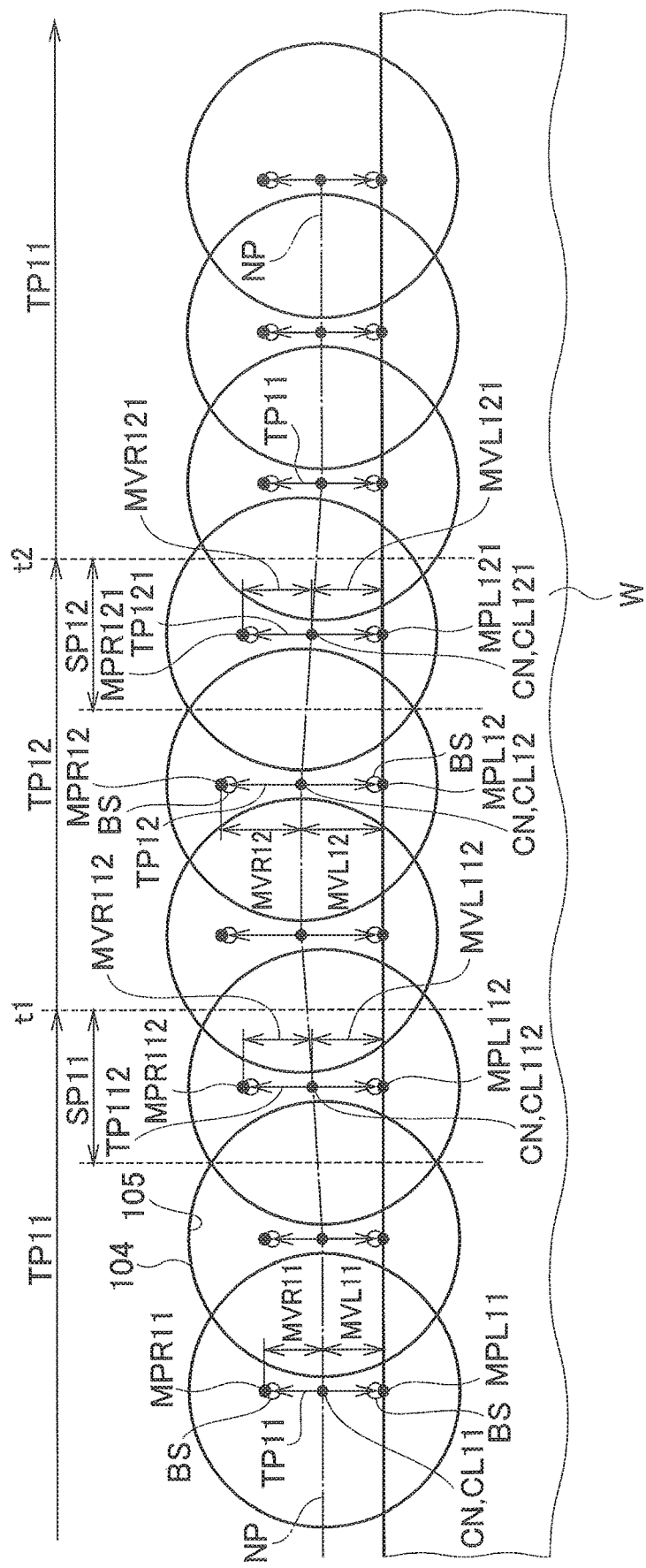
FIG. 5 is a diagram illustrating a state in which a tool trace is changed during cutting processing in a case where cutting tool change information is set with a presence of a switch interpolation and is set such that, in a case where a tool trace is switched, a control center point of the tool trace is not fixed.

FIG. 5 illustrates a case where the processing condition CP includes the cutting tool change information in which, at the switching time t1, the tool trace TP11 is switched to the tool trace TP12 and, at the switching time t2, the tool trace TP12 is switched to the tool trace TP11. FIG. 5 illustrates a case where the cutting tool change information is set with the presence of the switch interpolation and is set such that, in a case where the tool trace TP is switched, the control center point CL is not fixed.

In a case where the cutting tool change information is included in the processing condition CP, the tool radius compensation amount calculator 201 recognizes the tool traces TP11 and TP12 included in the cutting tool change information. In a case where the cutting tool change information is set with the presence of the switch interpolation, the tool radius compensation amount calculator 201 sets a tool trace interpolation time period SP11 in accordance with the switching time t1. The tool trace interpolation time period SP11 is a predetermined time period until the switching time t1.

The tool radius compensation amount calculator 201 extracts characteristic points of the tool trace TP11 and the tool trace TP12. The tool radius compensation amount calculator 201, based on the extracted characteristic points, sets a characteristic curve. The tool radius compensation amount calculator 201 keeps a ratio among each of points forming the characteristic curve constant and sets the tool trace TP112 during the tool trace interpolation time period SP11. The tool trace TP112 switches the tool trace TP11 and the tool trace TP12 in a stepwise manner, and thus, is an interpolation tool trace for interpolating the tool trace TP11 and the tool trace TP12.

The tool radius compensation amount calculator 201 generates the tool radius compensation information TC that includes the tool trace TP11 selected during a time period until the switching time t1, the control center point CL11 in the tool trace TP11, the tool radius compensation values MVL11 and MVR11, and the positions formed with surfaces to be processed MPL11 and MPR11.

The tool radius compensation amount calculator 201 generates the tool radius compensation information TC that includes the tool trace TP112 set during the tool trace interpolation time period SP11, the control center point CL112 in the tool trace TP112, the tool radius compensation values MVL112 and MVR112, and the positions formed with surfaces to be processed MPL112 and MPR112.

The tool radius compensation amount calculator 201 sets a tool trace interpolation time period SP12 in accordance with the switching time t2. The tool trace interpolation time period SP12 is a predetermined time period until the switching time t2. The tool radius compensation amount calculator 201 extracts characteristic points of the tool trace TP12 and the tool trace TP11. The tool radius compensation amount calculator 201 sets a characteristic curve based on the extracted characteristic points.

The tool radius compensation amount calculator 201 keeps ratios of each of points forming the characteristic curve constant and sets the tool trace TP121 during the tool trace interpolation time period SP12. The tool trace TP121 switches the tool trace TP21 and the tool trace TP11 in a stepwise manner and thus, is an interpolation tool trace for interpolating the tool trace TP12 and the tool trace TP11.

The tool radius compensation amount calculator 201 generates the tool radius compensation information TC that includes the tool trace TP12 selected during a time period from the switching time t1 to the switching time t2, the control center point CL12 in the tool trace TP12, the tool radius compensation values MVL12 and MVR12, and positions formed with surfaces to be processed MPL12 and MPR12.

The tool radius compensation amount calculator 201 generates the tool radius compensation information TC that includes the tool trace TP121 set during the tool trace interpolation time period SP12, the control center point CL121 in the tool trace TP121, tool radius compensation values MVL121 and MVR121, and the positions formed with surfaces to be processed MPL121 and MPR121.

The tool radius compensation amount calculator 201 generates the tool radius compensation information TC that includes the tool trace TP11 selected during the time period at or after the switching time t2, the control center point CL11 in the tool trace TP11, the tool radius compensation values MVL11 and MVR11, and the positions formed with surfaces to be processed MPL11 and MPR11. That is, the tool radius compensation information TC includes the pieces of tool radius compensation information for the tool traces TP11, TP112, TP12, and TP121.

The tool radius compensation amount calculator 201 outputs the tool radius compensation information TC to the processing trace calculator 202. The processing trace calculator 202 translates the G code included in the processing program PP. The processing trace calculator 202, based on the translation result, determines a cutting processing correction condition of either one of a case where the cutting processing is performed in the left-side tool radius compensation and a case where the cutting processing is performed in the right-side tool radius compensation.

In a case where it is determined that the cutting processing is performed in the left-side tool radius compensation, the processing trace calculator 202, based on the tool radius compensation information TC, during the tool trace interpolation time period SP11, generates the tool radius compensation control signal TS that includes fifth switching information for switching the tool trace TP11 to the tool trace TP112. Further, the tool radius compensation amount calculator 201, during the tool trace interpolation time period SP11, generates the tool radius compensation control signal TS that includes sixth switching information for switching the control center point CL11 and the tool radius compensation value MVL11 respectively to the control center point CL112 and the tool radius compensation value MVL112.

The processing trace calculator 202, based on the tool radius compensation information TC, at the switching time t1, generates the tool radius compensation control signal TS that includes seventh switching information for switching the tool trace TP112 to the tool trace TP12. Further, the tool radius compensation amount calculator 201, at the switching time t1, generates the tool radius compensation control signal TS that includes eighth switching information for switching the control center point CL112 and the tool radius compensation value MVL112 respectively to the control center point CL12 and the tool radius compensation value MVL12.

The processing trace calculator 202, based on the tool radius compensation information TC, during the tool trace interpolation time period SP12, generates the tool radius compensation control signal TS that includes ninth switching information for switching the tool trace TP12 to the tool trace TP121. Further, the tool radius compensation amount calculator 201, during the tool trace interpolation time period SP12, generates the tool radius compensation control signal TS that includes tenth switching information for switching the control center point CL12 and the tool radius compensation value MVL12 respectively to the control center point CL121 and the tool radius compensation value MVL121.

The processing trace calculator 202, based on the tool radius compensation information TC, at the switching time t2, generates the tool radius compensation control signal TS that includes eleventh switching information for switching the tool trace TP121 to the tool trace TP11. Further, the tool radius compensation amount calculator 201, at the switching time t2, generates the tool radius compensation control signal TS that includes twelfth switching information for switching the control center point CL121 and the tool radius compensation value MVL121 respectively to the control center point CL11 and the tool radius compensation value MVL11. That is, in a case where it is determined that the cutting processing is performed in the left-side tool radius compensation, the tool radius compensation amount calculator 201 generates the tool radius compensation control signal TS that includes the pieces of fifth to twelfth switching information.

The processing trace calculator 202 outputs the tool radius compensation control signal TS to the driving controller 203. The driving controller 203, based on the tool radius compensation control signal TS, generates the drive control signal CS. The driving controller 203, in accordance with the drive control signal CS, controls the processing machine body 100. The processing machine body 100, based on the drive control signal CS, drives the X-axis carriage 102 and the Y-axis carriage 103 and controls the nozzle trace NP. Further, the processing machine body 100, based on the drive control signal CS, drives the tool trace controller 300 and controls the tool trace TP.

In a case where the cutting tool change information is set with the presence of the switch interpolation and is set such that, in a case where the tool trace TP is switched, the control center point CL of the tool trace TP is not fixed, the processing machine body 100 switches the tool trace TP11 to the tool trace TP12 via the tool trace TP112 set during the tool trace interpolation time period SP11 in a stepwise manner.

Further, the processing machine body 100 performs a tool radius compensation in which the control center point CL11 and the tool radius compensation value MVL11 are changed to the control center point CL12 and the tool radius compensation value MVL12 in a stepwise manner via the control center point CL112 and the tool radius compensation value MVL112.

The processing machine body 100 switches the tool trace TP12 to the tool trace TP11 in a stepwise manner via the tool trace TP121 set during the tool trace interpolation time period SP12. The processing machine body 100 performs a tool radius compensation in which the control center point CL21 and the tool radius compensation value MVL21 are changed to the control center point CL11 and the tool radius compensation value MVL11 in a stepwise manner via the control center point CL121 and the tool radius compensation value MVL121.

As illustrated in FIG. 5, in a case where the control center point CL of the tool trace TP is not fixed to the positions formed with surfaces to be processed MPL and MPR corresponding to the surface to be processed of the final processed product when the tool trace TP is changed, the nozzle trace NP is controlled in accordance with the changed tool trace TP. The tool traces TP11 and TP12 illustrated in FIG. 5 vary in amplitudes in the direction orthogonal to the propagation direction DT of cutting processing. Therefore, the nozzle trace NP is controlled to move in a stepwise manner in the direction orthogonal to the propagation direction DT of cutting processing in accordance with the changed tool trace TP.

Figure 6:
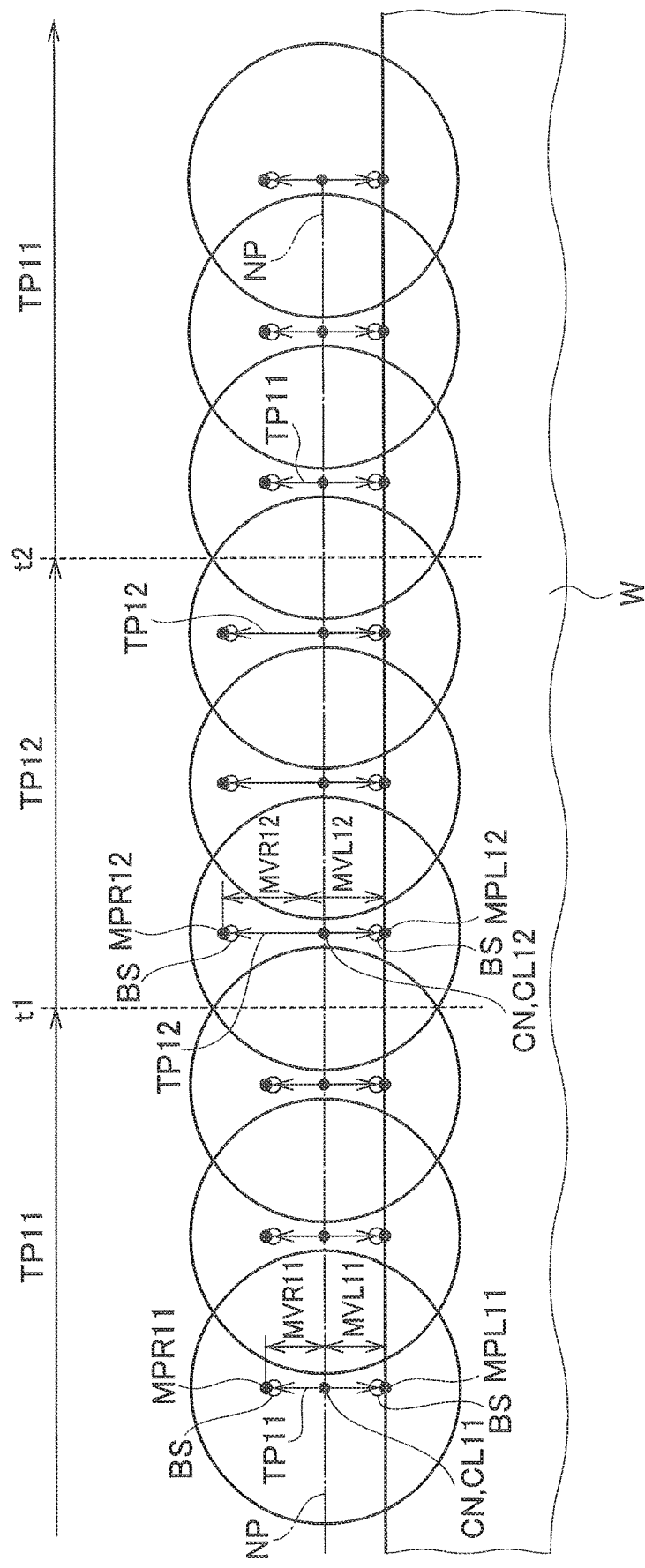
FIG. 6 is a diagram illustrating a state in which a tool trace is changed during cutting processing in a case where cutting tool change information is set with an absence of a switch interpolation and is set such that, in a case where a tool trace is switched, a control center point of the tool trace is fixed.

FIG. 6 illustrates a case where the processing condition CP includes the cutting tool change information in which, at the switching time t1, the tool trace TP11 is switched to the tool trace TP12 and, at the switching time t2, the tool trace TP12 is switched to the tool trace TP11. FIG. 6 illustrates a case where the cutting tool change information is set with the absence of the switch interpolation and is set such that, in a case where the tool trace TP is switched, the control center point CL is fixed.

In a case where the cutting tool change information is included in the processing condition CP, the tool radius compensation amount calculator 201 recognizes the tool traces TP11 and TP12 included in the cutting tool change information. The tool radius compensation amount calculator 201 fixes the control center point CL11 of the tool trace TP11 and the control center point CL12 of the tool trace TP12 to the surface to be processed of the final processed product.

The tool radius compensation amount calculator 201 generates the tool radius compensation information TC that includes the tool trace TP11 selected during the time period until the switching time t1, the control center point CL11 in the tool trace TP11, the tool radius compensation values MVL11 and MVR11, and the positions formed with surfaces to be processed MPL11 and MPR11. The position formed with the surface to be processed MPL11 becomes the switch reference position of the tool trace TP11.

The tool radius compensation amount calculator 201 generates the tool radius compensation information TC that includes the tool trace TP12 selected during the time period from the switching time t1 to the switching time t2, the control center point CL12 in the tool trace TP12, the tool radius compensation values MVL12 and MVR12, and positions formed with surfaces to be processed MPL12 and MPR12. The position formed with the surface to be processed MPL12 becomes the switch reference position of the cutting tool CT2.

The tool radius compensation amount calculator 201 generates the tool radius compensation information TC that includes the tool trace TP11 selected during the time period at or after the switching time t2, the control center point CL11 in the tool trace TP11, tool radius compensation values MVLL11 and MVLR11, and the positions formed with surfaces to be processed MPL11 and MPR11. The tool radius compensation amount calculator 201 outputs the tool radius compensation information TC to the processing trace calculator 202.

The processing trace calculator 202 translates the G code included in the processing program PP. The processing trace calculator 202, based on the translation result, determines a cutting processing correction condition of either one of a case where the cutting processing is performed in the left-side tool radius compensation and a case where the cutting processing is performed in the right-side tool radius compensation.

In a case where it is determined that the cutting processing is performed in the left-side tool radius compensation, the processing trace calculator 202, based on the tool radius compensation information TC, at the switching time t1, causes the position formed with the surface to be processed MPL11 to be matched the position formed with the surface to be processed MPL12 and generates the tool radius compensation control signal TS that includes thirteenth switching information for switching the tool trace TP11 to the tool trace TP12.

Further, the processing trace calculator 202 fixes the control center point CL11 to the position formed with the surface to be processed MPL11, fixes the control center point CL12 to the position formed with the surface to be processed MPL12 such that the tool radius compensation value MVL11 and the tool radius compensation value MVL12 have the same value, and generates the tool radius compensation control signal TS that includes fourteenth switching information for switching the control center point CL11 to the control center point CL12.

The processing trace calculator 202, based on the tool radius compensation information TC, at the switching time t2, causes the position formed with the surface to be processed MPL12 to be matched the position formed with the surface to be processed MPL11 and generates the tool radius compensation control signal TS that includes fifteenth switching information for switching the tool trace TP12 to the tool trace TP11.

Further, the processing trace calculator 202 fixes the control center point CL11 to the position formed with the surface to be processed MPL11, fixes the control center point CL12 to the position formed with the surface to be processed MPL12 such that the tool radius compensation value MVL11 and the tool radius compensation value MVL12 have the same value, and generates the tool radius compensation control signal TS that includes sixteenth switching information for changing the control center point CL12 to the control center point CL11. That is, the tool radius compensation amount calculator 201 generates the tool radius compensation control signal TS that includes the pieces of thirteenth to sixteenth switching information.

The processing trace calculator 202 outputs the tool radius compensation control signal TS to the driving controller 203. The driving controller 203, based on the tool radius compensation control signal TS, generates the drive control signal CS. The driving controller 203, in accordance with the drive control signal CS, controls the processing machine body 100. The processing machine body 100, based on the drive control signal CS, drives the X-axis carriage 102 and the Y-axis carriage 103 and controls the nozzle trace NP. Further, the processing machine body 100, based on the drive control signal CS, drives the tool trace controller 300 and controls the tool trace TP.

In a case where it is determined that the cutting processing is performed in the left-side tool radius compensation, the cutting tool change information is set with the absence of the switch interpolation, and it is set such that the control center point CL of the tool trace TP is fixed when the tool trace TP is switched, the processing machine body 100, at the switching time t1, causes the position formed with the surface to be processed MPL11 to be matched the position formed with the surface to be processed MPL12 and instantaneously switches the tool trace TP11 to the tool trace TP12. The processing machine body 100, at a switching timing, fixes control center points CL11 and CL12 and performs a tool radius compensation such that the tool radius compensation value MVL12 and the tool radius compensation value MVL11 have the same value.

The processing machine body 100, at the switching time t2, causes a position formed with a surface to be processed MPR12 to be matched a position formed with a surface to be processed MPR11 and instantaneously switches the tool trace TP12 to the tool trace TP11. The processing machine body 100, at a switching timing, fixes control center points CL12 and CL11 and performs a tool radius compensation such that the tool radius compensation value MVL12 and the tool radius compensation value MVL11 have the same value.

As illustrated in FIG. 6, in a case where the control center point CL of the tool trace TP is fixed to the surface to be processed of the final processed product when the tool trace TP is changed, under a condition that the changed tool trace TP is positioned in the opening 105 of the nozzle 106, a state in maintained in which the control center point CL matches the nozzle center point CN. Therefore, the tool trace TP can be changed without the nozzle trace NP receiving an influence of the changed tool trace TP.

Figure 7:
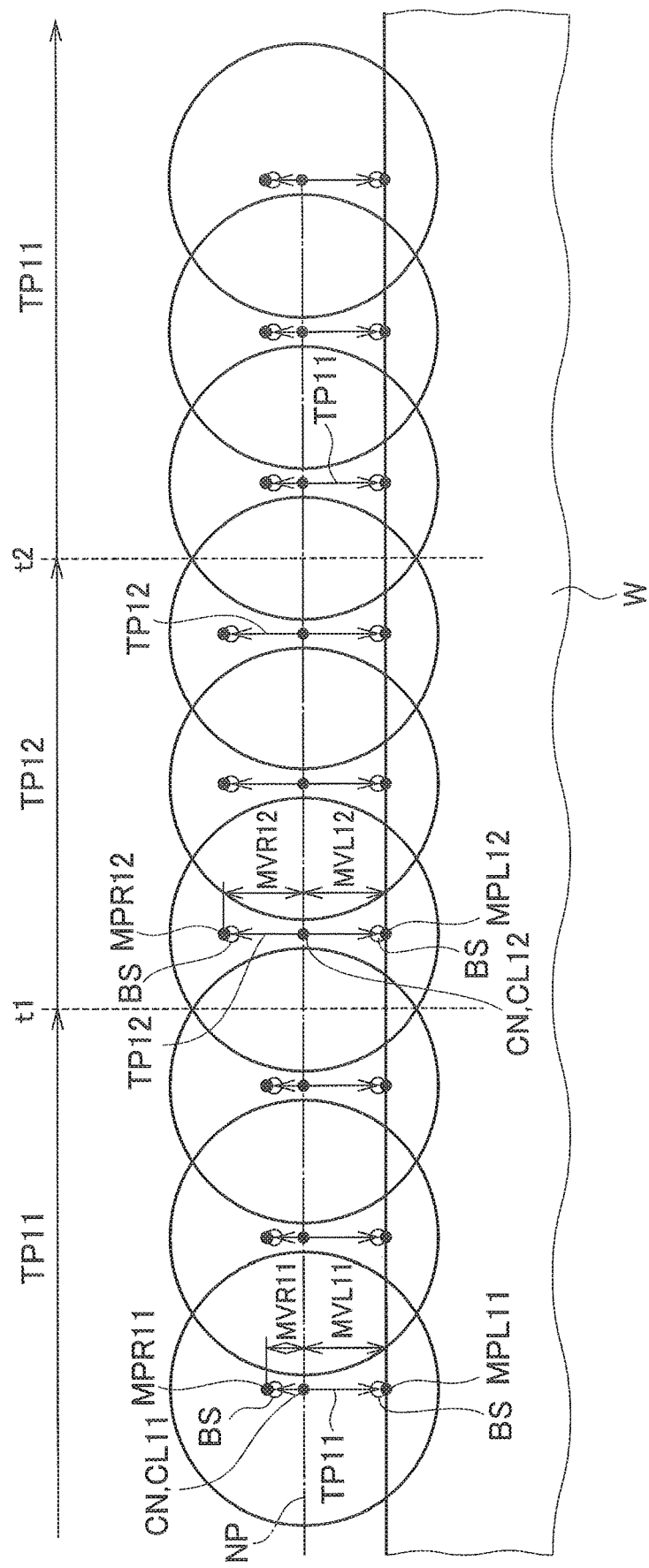
FIG. 7 is a diagram illustrating a state in which a tool trace is changed during cutting processing in a case where cutting tool change information is set with an absence of a switch interpolation and is set such that, in a case where a tool trace is switched, a control center point of the tool trace is fixed.

FIG. 7 illustrates a case where the processing condition CP includes the cutting tool change information in which, at the switching time t1, the tool trace TP11 is switched to the tool trace TP12, and at the switching time t2, the tool trace TP12 is switched to the tool trace TP11. FIG. 7 illustrates a case where the cutting tool change information is set with the absence of the switch interpolation and is set such that, in a case where the tool trace TP is switched, the control center point CL is fixed.

In a case where the cutting tool change information is included in the processing condition CP, the tool radius compensation amount calculator 201 recognizes the tool traces TP11 and TP12 included in the cutting tool change information. The tool radius compensation amount calculator 201 fixes the control center point CL11 of the tool trace TP11 and the control center point CL12 of the tool trace TP12 relative to the surface to be processed of the final processed product.

The tool radius compensation amount calculator 201 generates the tool radius compensation information TC that includes the tool trace TP11 selected during the time period until the switching time t1, the control center point CL11 in the tool trace TP11, the tool radius compensation values MVL11 and MVR11, and the positions formed with surfaces to be processed MPL11 and MPR11. The position formed with the surface to be processed MPL11 becomes the switch reference position of the tool trace TP11.

The tool radius compensation amount calculator 201 generates the tool radius compensation information TC that includes the tool trace TP12 selected during the time period from the switching time t1 to the switching time t2, the control center point CL12 in the tool trace TP12, the tool radius compensation values MVL12 and MVR12, and positions formed with surfaces to be processed MPL12 and MPR12. The position formed with the surface to be processed MPL12 becomes the switch reference position of the cutting tool CT2.

The tool radius compensation amount calculator 201 generates the tool radius compensation information TC that includes the tool trace TP11 selected during the time period at or after the switching time t2, the control center point CL11 in the tool trace TP11, the tool radius compensation values MVLL11 and MVLR11, and the positions formed with surfaces to be processed MPL11 and MPR11. The tool radius compensation amount calculator 201 outputs the tool radius compensation information TC to the processing trace calculator 202.

The processing trace calculator 202 translates the G code included in the processing program PP. The processing trace calculator 202, based on the translation result, determines a cutting processing correction condition of either one of a case where the cutting processing is performed in the left-side tool radius compensation and a case where the cutting processing is performed in the right-side tool radius compensation.

In a case where it is determined that the cutting processing is performed in the left-side tool radius compensation, the processing trace calculator 202, based on the tool radius compensation information TC, at the switching time t1, causes the position formed with the surface to be processed MPL11 to be matched the position formed with the surface to be processed MPL12 and generates the tool radius compensation control signal TS that includes seventeenth switching information for switching the tool trace TP11 to the tool trace TP12.

Further, the processing trace calculator 202 fixes the control center point CL12 relative to the position formed with the surface to be processed MPL12, fixes the control center point CL11 relative to the position formed with the surface to be processed MPL11 such that the tool radius compensation value MVL12 and the tool radius compensation value MVL11 have the same value, and generates the tool radius compensation control signal TS that includes eighteenth switching information for changing the control center point CL11 to the control center point CL12.

Further, the processing trace calculator 202, based on the tool radius compensation information TC, at the switching time t2, causes the position formed with the surface to be processed MPL12 to be matched the position formed with the surface to be processed MPL11 and generates the tool radius compensation control signal TS that includes nineteenth switching information for switching the tool trace TP12 to the tool trace TP11.

The processing trace calculator 202 fixes the control center point CL12 relative to the position formed with the surface to be processed MPL12, fixes the control center point CL11 relative to the position formed with the surface to be processed MPL11 such that the tool radius compensation value MVL12 and the tool radius compensation value MVL11 have the same value, and generates the tool radius compensation control signal TS that includes twentieth switching information for changing the control center point CL12 to the control center point CL11. That is, the tool radius compensation amount calculator 201 generates the tool radius compensation control signal TS that includes the pieces of seventeenth to twentieth switching information.

The processing trace calculator 202 outputs the tool radius compensation control signal TS to the driving controller 203. The driving controller 203, based on the tool radius compensation control signal TS, generates the drive control signal CS. The driving controller 203 controls the processing machine body 100 in accordance with the drive control signal CS. The processing machine body 100, based on the drive control signal CS, drives the X-axis carriage 102 and the Y-axis carriage 103 and controls the nozzle trace NP. The processing machine body 100, based on the drive control signal CS, drives the tool trace controller 300 and controls the tool trace TP.

In a case where it is determined that the cutting processing is performed in the left-side tool radius compensation, the cutting tool change information is set with the absence of the switch interpolation, and it is set such that, in a case where the tool trace TP is switched, the control center point CL of the tool trace TP is fixed, the processing machine body 100, at the switching time t1, causes the position formed with the surface to be processed MPL11 to be matched the position formed with the surface to be processed MPL12 and instantaneously switches the tool trace TP11 to the tool trace TP12. Further, the processing machine body 100, at a switching timing, fixes the control center points CL11 and CL12 and performs the tool radius compensation such that the tool radius compensation value MVL11 and the tool radius compensation value MVL12 have the same value.

The processing machine body 100, at the switching time t1, causes the position formed with the surface to be processed MPR11 to be matched the position formed with the surface to be processed MPR12 and instantaneously switches the tool trace TP11 to the tool trace TP12. The processing machine body 100, at a switching timing, fixes the control center points CL12 and CL11 and performs the tool radius compensation such that the tool radius compensation value MVL11 and the tool radius compensation value MVL12 have the same value.

As illustrated in FIG. 7, in a case where the control center point CL of the tool trace TP is fixed relative to the surface to be processed of the final processed product when the tool trace TP is changed, under a condition in which the changed tool trace TP is positioned in the opening 105 of the nozzle 106, a state is maintained in which the control center point CL matches the nozzle center point CN. Therefore, the tool trace TP can be changed without the nozzle trace NP receiving an influence of the changed tool trace TP.

Figure 8A:
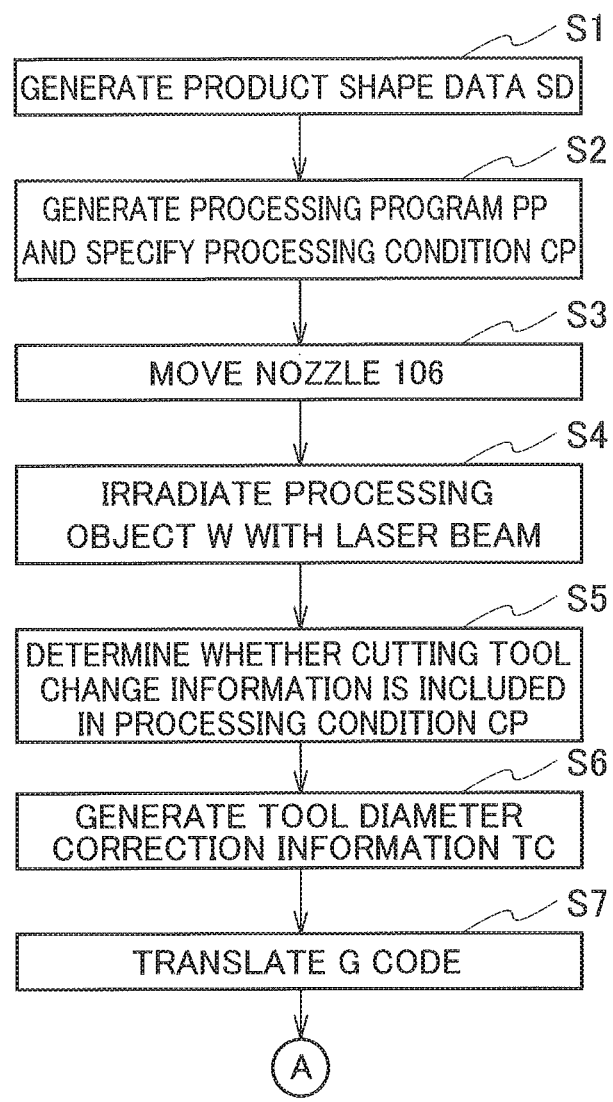
FIG. 8A is a flowchart illustrating an example of a cutting processing method according to an embodiment.
Figure 8B:
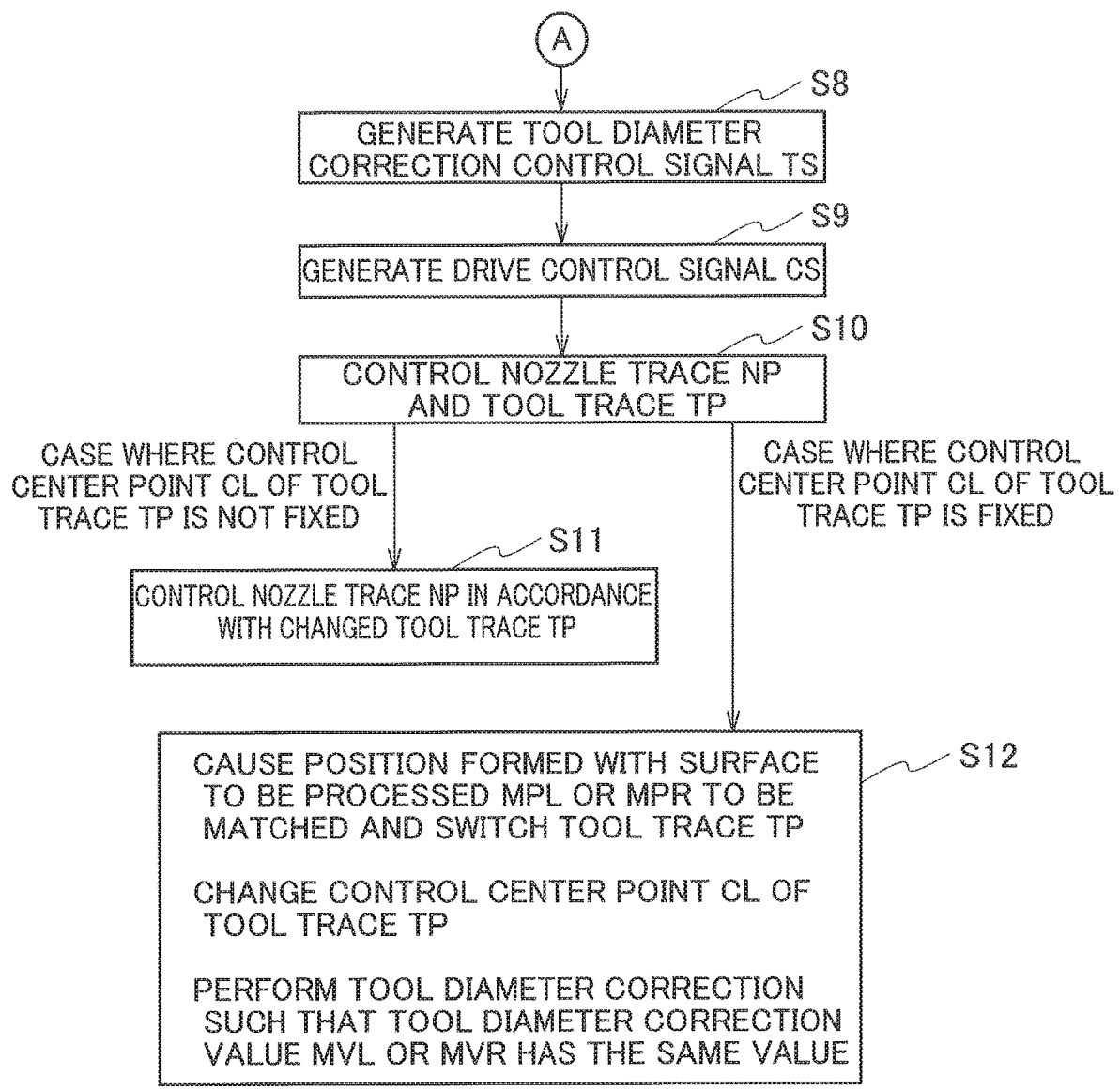
FIG. 8B is a flowchart illustrating an example of a cutting processing method according to an embodiment.

With reference to flowcharts illustrated in FIG. 8A and FIG. 8B, an example of a cutting processing method is described. The CAD device 20, in step S1 illustrated in FIG. 8A, based on product shape information including a size and a shape of a final processed product, generates the product shape data SD. Further, the CAD device 20 outputs the product shape data SD to the CAM device 21.

The CAM device 21, in step S2, based on the product shape data SD, generates the processing program PP (including the G code) of the cutting processing machine 1 and specifies the processing condition CP. Further, the CAM device 21 outputs the processing program PP and the processing condition CP to the NC device 200 in the cutting processing machine 1.

The NC device 200, in step S3, moves the nozzle 106 to an objective position by, based on the processing program PP and the processing condition CP, controlling the processing machine body 100 and driving the X-axis carriage 102 and the Y-axis carriage 103. Further, the NC device 200, in step S4, irradiates the processing object W with a laser beam that is emitted through the opening 105 of the nozzle 106 by, based on the processing program PP and the processing condition CP, controlling the laser oscillator 10. Timings at which processes of step S3 and step S4 are performed are controlled based on the processing program PP and the processing condition CP.

The tool radius compensation amount calculator 201 and the processing trace calculator 202 in the NC device 200, in step S2, receive the processing program PP and the processing condition CP from the CAM device 21. The tool radius compensation amount calculator 201 determines, in step S5, whether the cutting tool change information is included in the processing condition CP.

The cutting tool change information is set with whether the control center point CL for controlling the tool trace TP is fixed relative to the surface to be processed of the final processed product when the tool trace TP is switched. In a case where it is recognized that the cutting tool change information is not included in the processing condition CP, the tool radius compensation amount calculator 201 recognizes the tool trace TP included in the processing condition CP. Alternatively, in a case where it is recognized that the cutting tool change information is included in the processing condition CP, the tool radius compensation amount calculator 201 recognizes the plurality of tool traces TP included in the cutting tool change information.

The tool radius compensation amount calculator 201, in step S6, based on the processing program PP and the processing condition CP, generates the tool radius compensation information TC that includes the plurality of tool traces TP, the positions formed with surfaces to be processed MPL and MPR that become the switch reference positions of the plurality of tool traces TP, each of the control center points CL in the plurality of tool traces TP, and each of the tool radius compensation values MVL and MVR. The tool radius compensation amount calculator 201 outputs the tool radius compensation information TC to the processing trace calculator 202.

The processing trace calculator 202, in step S2, receives the processing program PP and the processing condition CP from the CAM device 21, and in step S6, receives the tool radius compensation information TC from the tool radius compensation amount calculator 201. The processing trace calculator 202, in step S7, translates the G code included in the processing program PP. Further, the processing trace calculator 202, based on the translation result, determines a cutting processing correction condition of either one of a case where the cutting processing is performed in the left-side tool radius compensation and a case where the cutting processing is performed in the right-side tool radius compensation.

The processing trace calculator 202, in step S8 illustrated in FIG. 8B, generates the tool radius compensation control signal TS based on the processing program PP, the processing condition CP, the tool radius compensation information TC, and the determined cutting processing correction condition. The processing trace calculator 202 outputs the tool radius compensation control signal TS to the driving controller 203. The driving controller 203, in step S9, based on the tool radius compensation control signal TS, generates the drive control signal CS for controlling the processing machine body 100. The driving controller 203 outputs the drive control signal CS to the processing machine body 100.

The processing machine body 100, in step S10, based on the drive control signal CS, drives the X-axis carriage 102 and the Y-axis carriage 103 and controls the nozzle trace NP. Further, the processing machine body 100, based on the drive control signal CS, drives the tool trace controller 300 and controls the tool trace TP.

In a case where the cutting tool change information is set such that, in a case where the tool trace TP is switched, the control center point CL of the tool trace TP is not fixed, the processing machine body 100, in step S11, causes the nozzle 106 to be moved in accordance with the changed tool trace TP.

In a case where the cutting tool change information is set such that, in a case where the tool trace TP is switched, the control center point CL of the tool trace TP is fixed, the processing machine body 100, in step S12, at the switching time t, causes a position formed with a surface to be processed MPL or MPR to be matched and switches the tool trace TP. The processing machine body 100, at a switching timing, fixes the control center point CL of the tool trace TP and performs a tool radius compensation such that a tool radius compensation value MV of one of the tool traces TP has the same value as a value of the other tool trace.

In accordance with the cutting processing machine and the cutting processing method according to the present embodiment, the tool radius compensation information TC including correction information based on the tool trace TP and correction information based on the nozzle trace NP is generated. In accordance with the cutting processing machine and the cutting processing method according to the present embodiment, the nozzle trace NP and the tool trace TP are controlled by, based on the tool radius compensation information TC, controlling driving of the processing unit 104 and driving of the tool trace controller 300. Accordingly, in accordance with the cutting processing machine and the cutting processing method according to the present embodiment, even in a case where the cutting processing trace in a state where the tool trace corresponding to the cutting tool or a relative position between a nozzle and a processing stage is fixed has a noncircular shape, a tool diameter of a cutting tool can be corrected with high precision.

There is a case where the processing condition CP includes the cutting tool change information set with the change of the tool trace TP during the cutting processing and set with whether to fix the control center point CL for controlling the tool trace TP to the surface to be processed of the final processed product at the time of changing the tool trace TP. In accordance with the cutting processing machine and the cutting processing method according to the present embodiment, in a case where the cutting tool change information is set such that the control center point CL is not fixed, the nozzle trace NP is controlled in accordance with the changed tool trace TP.

In accordance with the cutting processing machine and the cutting processing method according to the present embodiment, in a case where the cutting tool change information is set such that the control center point CL is fixed, at the switching time t, the position formed with the surface to be processed MPL or MPR is caused to be matched, the tool trace TP is changed, the control center point CL of the tool trace TP is fixed, and a tool radius compensation is performed such that the tool radius compensation value MVL or MVR has the same value.

Accordingly, in accordance with the cutting processing machine and the cutting processing method according to the present embodiment, in a case where the cutting tool change information is set such that the control center point CL is fixed, under a condition in which the changed tool trace TP is positioned in the opening 105 of the nozzle 106, the tool trace TP can be changed without the nozzle trace NP receiving an influence of the changed tool trace TP.

The present invention is not limited to the embodiment described above, and various modifications are possible within a scope not departing from a scope of the present invention.

In the cutting processing machine and the cutting processing method according to the present embodiment, even though a single interpolation tool trace is set for each of the tool trace interpolation time periods SP11 and SP12, a plurality of interpolation tool traces may be set to each of them.

Even in a case where the cutting tool change information is set such that the control center point CL is fixed, a tool trace interpolation time period SP may be set in accordance with the switching time t of the tool trace and the interpolation tool trace may be set during the tool trace interpolation time period SP.

The cutting processing machine and the cutting processing method according to the present embodiment have been described by taking a laser processing machine and a laser processing method as examples, but the present invention is also applicable to, for example, a water jet processing device.

The disclosure of the present application is related to the subject matter described in Japanese Patent Application No. 2018-044115 filed on Mar. 12, 2018, the entire disclosures of which are incorporated herein by reference.

The invention claimed is:

1. A cutting processing machine comprising:
a processing machine body configured to perform cutting processing with a laser beam to a processing object; and
an NC device configured to control the processing machine body; wherein
the NC device comprises:
a tool radius compensation amount calculator configured to generate tool radius compensation information for correcting a tool diameter of a cutting tool used for performing the cutting processing to the processing object in accordance with a processing program and a processing condition set based on product shape information indicating a size and a shape of a final processed product obtained by performing the cutting processing to the processing object;
a processing trace calculator configured to generate a tool radius compensation control signal including a cutting processing correction condition based on the processing program, the processing condition, and the tool radius compensation information; and
a driving controller configured to generate a drive control signal for controlling the processing machine body based on the tool radius compensation control signal; wherein
the processing machine body comprises:
a processing unit configured to perform the cutting processing to the processing object by changing a position relative to the processing object; and
a tool trace controller configured to control a tool trace that corresponds to the cutting tool and includes a noncircular shape based on the drive control signal, the tool trace forming a shape obtained by oscillating the laser beam in a noncircular oscillation pattern; wherein
in a case where the processing condition includes cutting tool change information set with a change of the tool trace during the cutting processing and set such that a control center point for controlling the tool trace is fixed relative to a surface to be processed of the final processed product at a time of changing the tool trace;
the tool radius compensation amount calculator recognizes a plurality of tool traces included in the cutting tool change information and generates the tool radius compensation information that includes the plurality of tool traces, positions formed with a surface to be processed that are switch reference positions of the plurality of tool traces, each control center point of the plurality of tool traces, and tool radius compensation values corresponding to a distance from the control center point to each position formed with the surface to be processed;
the processing trace calculator generates the tool radius compensation control signal for switching the plurality of tool traces; and
the processing machine body, based on the tool radius compensation control signal, shifts the control center point by the tool radius compensation values, fixes the control center point, causes the positions formed with the surface to be processed of the plurality of tool traces to be matched, and switches the tool trace such that the tool radius compensation values of the plurality of tool traces have the same value.

2. The cutting processing machine according to claim 1, wherein
the processing machine body is controlled by the NC device and further comprises a laser oscillator configured to generate a laser beam;
the processing unit has a tip portion attached with a nozzle with an opening through which the laser beam is emitted to irradiate the processing object therewith; and
the tool trace controller is housed in the processing unit and controls the tool trace by causing the laser beam emitted through the opening to be oscillated in the noncircular oscillation pattern.

3. A cutting processing method comprising:
generating tool radius compensation information for correcting a tool diameter of a cutting tool used for performing cutting processing with a laser beam to a processing object in accordance with a processing program and a processing condition set based on product shape information indicating a size and a shape of a final processed product obtained by performing the cutting processing to the processing object;
generating a tool radius compensation control signal based on the processing program, the processing condition, and the tool radius compensation information;
generating a drive control signal based on the tool radius compensation control signal;
in a case where the processing condition includes cutting tool change information set with a change of a tool trace that corresponds to the cutting tool during the cutting processing and set such that a control center point for controlling the tool trace is fixed relative to a surface to be processed of the final processed product at a time of changing the tool trace, the tool trace forming a shape obtained by oscillating the laser beam in a noncircular oscillation pattern;
recognizing a plurality of tool traces included in the cutting tool change information;
generating the tool radius compensation information that includes the plurality of tool traces, positions formed with a surface to be processed that are switch reference positions of the plurality of tool traces, each control center point of the plurality of tool traces, and tool radius compensation values corresponding to a distance from the control center point to each position formed with the surface to be processed;

generating the tool radius compensation control signal for switching the plurality of tool traces; and based on the tool radius compensation control signal, shifting the control center point by the tool radius compensation values, fixing the control center point, causing the positions formed with the surface to be processed of the plurality of tool traces to be matched, and switching the tool trace such that the tool radius compensation values of the plurality of tool traces have the same value.

4. The cutting processing method according to claim 3, comprising:

irradiating the processing object with a laser beam; and controlling the tool trace by causing the laser beam to be oscillated in the noncircular oscillation pattern.

5. A cutting processing machine comprising:

a processing machine body configured to perform cutting processing to a processing object; and an NC device configured to control the processing machine body; wherein the NC device:

generates tool radius compensation information for correcting a tool diameter of a cutting tool used for performing the cutting processing to the processing object in accordance with a processing program and a processing condition set based on product shape information indicating a size and a shape of a final processed product obtained by performing the cutting processing to the processing object;

generates a tool radius compensation control signal including a cutting processing correction condition based on the processing program, the processing condition, and the tool radius compensation information; and generates a drive control signal for controlling the processing machine body based on the tool radius compensation control signal; wherein the processing machine body comprises:

a galvano scanner unit comprising scanning mirrors configured to control a tool trace that corresponds to the cutting tool and includes a noncircular shape based on the drive control signal, the tool trace forming a shape obtained by oscillating the laser beam in a noncircular oscillation pattern; and a processing unit comprising the galvano scanner unit and a focusing lens configured to perform the cutting processing to the processing object by changing a position relative to the processing object; wherein in a case where the processing condition includes cutting tool change information set with a change of the tool trace during the cutting processing and set such that a control center point for controlling the tool trace is fixed relative to a surface to be processed of the final processed product at a time of changing the tool trace;

the NC device recognizes a plurality of tool traces included in the cutting tool change information and generates the tool radius compensation information that includes the plurality of tool traces, positions formed with a surface to be processed that are switch reference positions of the plurality of tool traces, each control center point of the plurality of tool traces, and tool radius compensation values corresponding to a distance from the control center point to each position formed with the surface to be processed;

the NC device generates the tool radius compensation control signal for switching the plurality of tool traces; and the processing machine body, based on the tool radius compensation control signal, shifts the control center point by the tool radius compensation values, fixes the control center point, causes the positions formed with the surface to be processed of the plurality of tool traces to be matched, and switches the tool trace such that the tool radius compensation values of the plurality of tool traces have the same value.

\* \* \* \* \*